Patented June 15, 1954

UNITED STATES PATENT OFFICE 2,681,340

AMINO ESTERS

Gustav Ehrhart and Heinrich Ruschig, Bad Soden (Taunus), and Walter Aumüller, Frankfurt (Main), Germany, assignors to Farbwerke-Hoechst Aktiengesellschaft vormals Meister Lucius & Bruning, Frankfurt (Main), Hochst, Germany, a German company No Drawing. Application June 30, 1953, Serial No. 365,268

Claims priority, application Germany May 26, 1951

6 Claims. (Cl. 260—294.3)

The present invention relates to basic ethers and to a process of preparing them. The new basic ethers obtained according to the present invention are compounds having the general formula

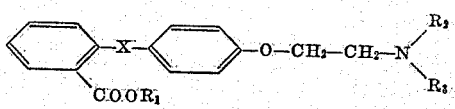

in which X represents CO or $CH_2$, $R_1$ a lower alkyl, and $R_2$ and $R_3$ stand for hydrogen, lower alkyl or together with N for a piperidino or pyrrolidino radical. These compounds and their salts have valuable therapeutic properties and especially the benzophenone derivatives, i. e. the compounds in which X stands for CO, are distinguished by their pharmacological effect.

First of all, the compounds are excellent antispasmodics, but they have also a strong local anesthetic effect. The local anesthetic effect of 4'-β-piperidino-ethoxy - 2 - carbethoxybenzophenone hydrochloride at the guinea pig's wheal, for instance, is twice as strong as that of para-amino-benzoyldiethylamino-ethanol hydrochloride and, compared to the known compound, the surface anesthetic effect is likewise twice as strong. The compound of the present invention possesses a very good atropine effect and, in addition, an analeptic effect. Whilst, according to the kind of amine, it has the same effect as atropine on the lentine spasm in the intestine, it shows only about ⅕-¼₀ of the secretion inhibiting effect of the glands compared to atropine.

The low salivation-inhibiting effect together with a good antispasmodic effect on the smooth musculature of the intestine favors the therapeutic application of 4'- β - piperidino-ethoxy-2-carbethoxy-benzophenone hydrochloride for spasmodic obstipation, intestinal spasms, ileus, pylorospasm of infants as well as for renal and biliary colic.

4'- β - pyrrolidino-ethoxy-2-carbethoxy-benzophenone hydrochloride and 4'-β-piperidino-ethoxy-2-carbethoxy-diphenyl-methane hydrochloride show a similar effect; 4'-β-piperidino-ethoxy-2-carbethoxy-diphenylmethane hydrochloride, too, is distinguished by a very good parasympatholytic effect. As compared with 4'-β-piperidino-ethoxy - 2 - carbethoxy-benzophenone hydrochloride, the 4'- β - piperidino-ethoxy-2-carbmethoxy-benzo-phenone hydrochloride possesses a smaller effect on the lenthine spasm, but has a far superior effect on the histamine spasm.

Compounds of the general formula

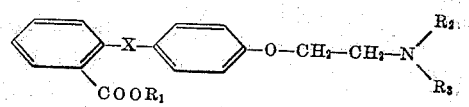

in which X, $R_1$, $R_2$, and $R_3$ have the above meaning, can be obtained in various manners. Compounds of the general formula

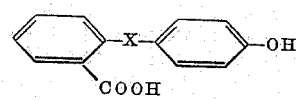

in which X stands for CO or $CH_2$, for instance, can in any desired sequence, be esterified at the carboxyl group and etherified at the phenolic hydroxyl group with an aliphatic compound carrying a basic nitrogenous radical of aliphatic nature.

4'-Oxybenzophenone-2-carboxylic acid can, for example, be esterified with an aliphatic alcohol of low molecular weight such as methanol, ethanol, propanol, isopropyl alcohol, butanol or isobutyl alcohol. The resulting 4'-oxybenzophenone-2-carboxylic acid esters can then be etherified with aliphatic compounds carrying a basic nitrogenous radical of aliphatic nature.

As aliphatic radicals substituted by a basic nitrogenous radical of aliphatic nature there may be mentioned: amino alkyl such as amino ethyl, dialkyl amino alkyl such as dimethyl amino ethyl, diethyl amino ethyl, imidazolino methyl, pyrrolidino ethyl, piperidino alkyl, amidino alkyl, and the like. The piperidino alkyl radical, and above all the piperidino ethyl radical, are particularly suitable radicals of the kind in question. 4'-β-piperidino-ethoxy-2-carbethoxy - benzophenone hydrochloride, for instance, is distinguished by its excellent pharmacological effect.

Starting from esterified diphenyl methane carboxylic acids, the corresponding diphenyl methane derivatives can be obtained in the same manner. It is also possible to prepare the basic ethers of 4'-oxybenzophenone-2-carboxylic acid or 4'-oxy-diphenyl-methane-2-carboxylic acid by esterifying the carboxylic acids already etherified in 4'-position. 4'-oxybenzophenone carboxylic acid-(2) may also be used as starting material for the preparation of basic ethers of 4'-oxydiphenyl-methane carboxylic acid esters. In this case, the keto bridge is converted, by an intermediate process step, for instance by way of the benzhydrol, into a methylene group, for example, by reduction with zinc dust and ammonia. Various methods may be applied for the etherification of the phenolic hydroxy group. Alkaline or alkaline earth metal phenolates are advantageously reacted with reactive esters of aliphatic alcohols substituted by a basic nitrogenous radical of aliphatic nature, for example, with halogen hydracid esters, alkyl- or aryl sulfonic acid esters, sulfuric acid esters or alkyl sulfuric acid esters of the said alcohols.

Free phenols can also be etherified. It is recommended, however, to add an acid-binding agent such as potassium carbonate.

A further method for preparing basic ethers leads first to reactive intermediates of the etherification, such as cyanalkyl ether of the formula

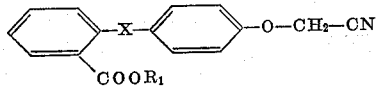

in which $X_1$ and $R_1$ have the above meaning. These intermediates can be converted, in a manner known as such, into amidines or imidazolines or can be reduced to primary amino ethers.

The following examples serve to illustrate the invention, but they are not intended to limit it thereto:

Example 1

29 grams of 4'-oxybenzophenone-2-carboxylic acid methyl ester in 280 cc. of dry methyl ethyl ketone are boiled for 3¾ hours under reflux with 33.4 grams of β-piperidino-ethyl chloride and 31 grams of dry potassium carbonate. After cooling, the mixture is filtered, methyl ethyl ketone and the excess of the base are removed by distillation under reduced pressure, and the residue is shaken with ether and caustic soda solution. The resulting ether solution is washed with water and dried with potassium carbonate. On addition of alcoholic hydrochloric acid to the ether solution until an acid reaction to Congo paper is obtained, the hydrochloride of 4'-β-piperidino-ethoxy-2-carbomethoxy-benzophenone precipitates in a smeary state. On triturating with isopropyl alcohol it becomes crystalline. It can be recrystallized from isopropyl alcohol. The yield amounts to 22 grams. The product melts at 168° C.–169° C.

Example 2

40.5 grams of 4'-oxybenzophenone-2-carboxylic acid ethyl ester are dissolved in 390 cc. of dry acetone and boiled under reflux for 3¾ hours with 33.1 grams of β-piperidinoethyl chloride and 41.4 grams of dry potassium carbonate. After cooling, the mixture is filtered with suction. The filtrate is rendered acid to Congo paper by adding alcoholic hydrochloric acid. 4'-β-piperidino-ethoxy-benzophenone-2-carboxylic acid ethyl ester hydrochloride crystallizes out. It is filtered off with suction and recrystallized from ethanol. The yield amounts to 56.2 grams. The product melts at 179° C.–180° C.

Example 3

27 grams of 4'-oxybenzophenone-2-carboxylic acid butyl ester in 270 cc. of dry acetone are boiled under reflux for 3¾ hours with 15 grams of β-piperidinoethyl chloride and 28 grams of dry potassium carbonate. After filtration with suction, the filtrate is rendered acid to Congo paper by addition of alcoholic hydrochloric acid, and the hydrochloride of 4'-β-piperidinoethoxy-(2)-carbobutoxy-benzophenone is precipitated with ether. As the salt precipitates at first in a smeary state it is, for further purification, converted into the oxalate, which is easily recrystallized from ethanol. The product melts at 133° C.–134° C.

For conversion into the citrate, the base is set free from the oxalate by means of sodium carbonate solution, taken up in ether and precipitated, by addition of an alcoholic solution of citric acid, as the primary citrate which is recrystallized from alcohol.

Example 4

9 grams of 4'-oxybenzophenone-2-carboxylic acid ethyl ester in 90 cc. of dry acetone are boiled for 2½ hours under reflux with 9 grams of β-diethylaminoethyl chloride and 9.2 grams of dry potassium carbonate. After standing overnight, the mixture is filtered with suction. The filtrate is rendered acid to Congo paper by adding alcoholic hydrochloric acid. On addition of ether, smears precipitate which solidify after some time. The ether is decanted, and the crystals are recrystallized from ethanol. 4'-β-diethylaminoethoxy - 2 - carbethoxy - benzophenone hydrochloride melting at 144° C. is obtained in a good yield.

Example 5

15 grams of 4'-oxy-diphenylmethane-2-carboxylic acid methyl ester in 150 cc. of dry methyl ethyl ketone are boiled under reflux with 13.7 grams of β-piperidino-ethyl chloride and 18 grams of dry potassium carbonate for 3¾ hours. After cooling and filtering, the filtrate is acidified with alcoholic hydrochloric acid. 25 grams of the crude 4'-β-piperidino-ethoxy-2-carbomethoxy-diphenyl-methane hydrochloride melting at 143° C.–149° C. crystallize out. After repeated recrystallization from ethanol the substance melts at 154° C.–155° C.

Example 6

9.5 grams of 4'-oxy-diphenyl-methane-2-carboxylic acid ethyl ester and 8.3 grams of β-piperidino-ethyl chloride are boiled under reflux in the presence of 10 grams of dry potassium carbonate in 100 cc. of methyl ethyl ketone for 3¾ hours. After filtration with suction, methyl ethyl ketone and the excess of the chlorine base are removed by distillation under reduced pressure, and the residue is taken up in ether. The ether solution is shaken with a dilute caustic soda solution and water and is dried over potassium carbonate. By acidification with an acetonic solution of oxalic acid, a precipitate of the acid 4' - β - piperidino - ethoxy - 2 - carbethoxy - diphenylmethane oxalate, melting at 136° C. after recrystallization from water, is obtained. In order to convert the product into the citrate, the base is set free by a solution of sodium carbonate, taken up in ether and precipitated as the primary citrate by addition of an alcoholic solution of citric acid. After recrystallization from methanol, the primary 4'-β-piperidino-ethoxy-2-carbethoxy-diphenylmethane citrate decomposes at 112° C.–113° C.

Example 7

42 grams of 4'-oxy-benzophenone-2-carboxylic acid ethyl ester in 420 cc. of dry acetone are boiled under reflux with 35 grams of β-pyrrolidino ethyl chloride and 43 grams of finely powdered, dry potassium carbonate for 4 hours on a steam bath. The hot solution is filtered off, allowed to cool, and alcoholic hydrochloric acid is added until the solution shows an acid reaction towards Congo paper. 4'-β-pyrrolidinoethoxy-2-carbethoxy-benzophenone hydrochloride precipitates in a good yield. For further purification, the crude product is dissolved in water, the solution is made alcaline with sodium carbonate, and the free base is extracted with ether. After drying with potassium carbonate and treating with animal charcoal, 4'-β-pyrolidino-ethoxy-2-carbethoxy-benzophenone hydrochloride is reprecipitated from the ether solution of the base by means of alcoholic hydrochloric acid. After recrystallization from ethanol the product melts at 178° C.

Example 8

40.5 grams of 4'-oxy-benzophenone-2-carboxylic acid ethyl ester in 360 cc. of methyl ethyl ketone are boiled under reflux with 12.3 grams of chloro-acetonitrile in the presence of 41.4 grams of dry potassium carbonate and 0.3 gram of potassium iodide for 3 hours. After filtration, the solution is evaporated to dryness under reduced pressure. The residue is dissolved by shaking with dilute sodium carbonate solution and ether and the solution obtained is extracted repeatedly with dilute sodium or potassium hydroxyde solution. The ether solution is washed with water and dried with potassium carbonate. The residue obtained after evaporation of the solvent becomes slowly crystalline. It is recrystallized from ethanol. 4'-cyano-methoxy-2-carbethoxy-benzophenone, melting at 80° C.–81° C., is obtained in a yield of 32.4 grams.

20 grams of 4'-cyanomethoxy-2-carbethoxy-benzophenone are dissolved in 400 cc. of methanol, and, after addition of 3.3 grams of ammonia, shaken at room temperature with hydrogen in the presence of Raney-nickel. After absorption of the calculated quantity of hydrogen, the catalyst is filtered off and the solution is evaporated to dryness under reduced pressure. The residue is shaken with dilute sodium carbonate solution and ether, and the ether solution is dried with potassium carbonate. By addition of an ether solution of oxalic acid, 4'-aminoethoxy-2-carbethoxy-benzophenone oxalate precipitates which, after recrystallization from methanol, melts at 132° C.

Example 9

42.6 grams of 4'-oxy-benzophenone-2-carboxylic acid ethyl ester in 300 cc. of methyl ethyl ketone are boiled under reflux for 4 hours with 28.2 grams of ω-chloromethyl-imidazoline hydrochloride in the presence of 24 grams of dry potassium carbonate and 3 grams of potassium iodide. After filtration with suction, methyl ethyl ketone is removed by distillation under reduced pressure, and the resulting viscous residue is dissolved by shaking with dilute caustic soda solution and acetic acid ethyl ester. The acetic acid ethyl ester solution is again extracted twice with dilute caustic soda solution, washed with water and dried with potassium carbonate. After filtration, the solution is acidified with an acetonic solution of oxalic acid, and ether is added until the formation of the precipitate ceases. By treating with warm ethanol the half-crystalline precipitate so obtained is freed from adhering smears, and is then filtered off with suction. The resulting 4'-imidazolino-methoxy-2-carbethoxy-benzophenone oxalate is recrystallized from ethanol. It melts at 193° C. with decomposition.

Example 10

12.1 grams of 4'-oxybenzophenone-2-carboxylic acid are added to a sodium methylate solution which was prepared from 2.3 grams of sodium and about 100 cc. of methanol. A clear solution is obtained which is evaporated to dryness under reduced pressure. The resulting crystal cake is digested with benzene, again evaporated to dryness and, after pulverization, added to a solution of 30 grams of β-piperidino-ethyl chloride in 200 cc. of methyl ethyl ketone. After boiling under reflux for 7 hours, the precipitated sodium chloride is filtered off, and the solvent is removed by distillation under reduced pressure. The residue is dissolved in dilute hydrochloric acid, and the non-basic constituents are removed by extraction with ether. When adding a strong solution of caustic soda, an oil separates which does not dissolve even when heated. It is separated and taken up in ethanol. After evaporation of the alcohol, preferably with addition of a little benzene, a crystal cake is obtained which is recrystallized from isopropyl alcohol. The crystals so purified are dissolved in a little water, and the alkaline solution is neutralized. Very soon the inner salt of 4'-β-piperidinoethoxy-2-carboxy-benzophenone crystallizes out in beautiful, colorless crystals. The salt is slightly soluble in the usual organic solvents, but it dissolves in dilute hydrochloric acid and in ammonia. It melts at 238° C.–239° C.

5 grams of 4'-β-piperidinoethoxy-carboxy-(2)-benzophenone (inner salt) are dissolved in 100 cc. of ethanol after addition of 5 grams of concentrated sulfuric acid. The solution is boiled under reflux for 4 hours, and is concentrated under reduced pressure. The residue is shaken with ether and an excess of potassium carbonate solution. The ether solution is dried with potassium carbonate. After filtration, alcoholic hydrochloric acid is added to the solution. A smeary precipitate of 4'-β-piperidino-ethoxy-2-carbethoxy-benzophenone hydrochloride is obtained which turns crystalline after a short time. The product is filtered off with suction and recrystallized from ethanol. It melts at 179° C.–180° C.

This application is a continuation-in-part of application Serial No. 289,006, filed May 20, 1952.

We claim:

1. A compound selected from the group which consists of a basic ether of the general formula

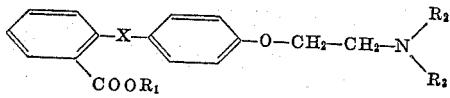

wherein X is a member selected from the group consisting of CO and $CH_2$, $R_1$ represents lower alkyl, and $R_2$ and $R_3$ are members selected from the group consisting of hydrogen, lower alkyl and further members wherein $R_2$ and $R_3$ taken together with —N< form piperidine and pyrrolidine and salts of said basic ether.

2. A compound selected from the group which consists of a basic ether of the formula

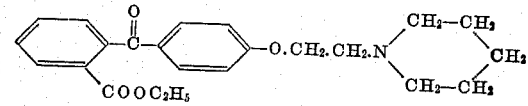

and salts of said basic ether.

3. A compound selected from the group which consists of a basic ether of the formula

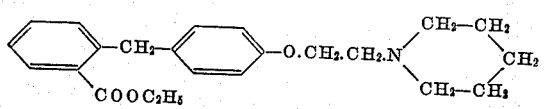

and salts of said basic ether.

4. A compound selected from the group which consists of a basic ether of the formula
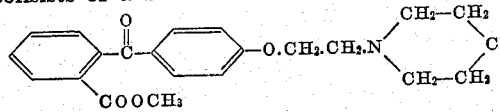
and salts of said basic ether.
5. A compound selected from the group which consists of a basic ether of the formula
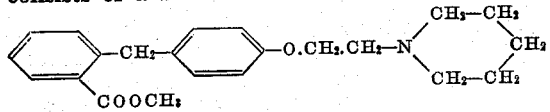
and salts of said basic ether.
6. A compound selected from the group which consists of a basic ether of the formula
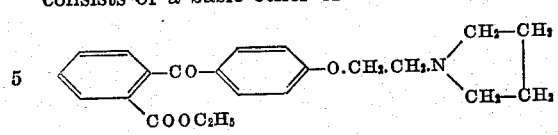
and salts of said basic ether.
No references cited.